(12) United States Patent
Rao et al.

(10) Patent No.: US 7,976,147 B2
(45) Date of Patent: Jul. 12, 2011

(54) INKS FOR INKJET PRINTING

(75) Inventors: YuanQiao Rao, Pittsford, NY (US); Nancy L. Furbeck, Rochester, NY (US); Steven Evans, Rochester, NY (US); Edward Schofield, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 249 days.

(21) Appl. No.: 12/165,923

(22) Filed: Jul. 1, 2008

(65) Prior Publication Data

US 2010/0003409 A1 Jan. 7, 2010

(51) Int. Cl.
*G01D 11/00* (2006.01)
(52) U.S. Cl. ............................ 347/100; 347/95; 347/101
(58) Field of Classification Search .................. 347/100, 347/95, 96, 101; 106/31.27, 31.13, 31.6; 523/160
See application file for complete search history.

(56) References Cited

U.S. PATENT DOCUMENTS

| | | |
|---|---|---|
| 4,049,780 A | 9/1977 | Newmann |
| 5,543,453 A | 8/1996 | Ito et al. |
| 5,560,996 A | 10/1996 | Ito et al. |
| 5,605,750 A | 2/1997 | Romano et al. |
| 5,644,350 A | 7/1997 | Ando et al. |
| 5,723,211 A | 3/1998 | Romano et al. |
| 5,789,070 A | 8/1998 | Shaw-Klein et al. |
| 6,001,161 A | 12/1999 | Evans et al. |
| 6,033,466 A | 3/2000 | Ito |
| 6,063,836 A | 5/2000 | Ito et al. |
| 6,087,051 A | 7/2000 | Shoji et al. |
| 6,177,501 B1 | 1/2001 | Ito et al. |
| 6,268,101 B1 | 7/2001 | Yacobucci et al. |
| 6,281,270 B1 | 8/2001 | Ito et al. |
| 6,464,767 B1 | 10/2002 | Evans et al. |
| 6,468,338 B1 | 10/2002 | Evans et al. |
| 6,854,840 B2 | 2/2005 | Rao et al. |
| 2002/0028288 A1* | 3/2002 | Rohrbaugh et al. ........... 427/180 |
| 2002/0150678 A1* | 10/2002 | Cramer et al. ................. 427/212 |
| 2004/0110865 A1 | 6/2004 | McCovick et al. |
| 2004/0110867 A1 | 6/2004 | McCovick |

FOREIGN PATENT DOCUMENTS

EP 0 813 978 11/2001

* cited by examiner

*Primary Examiner* — Manish S Shah
(74) *Attorney, Agent, or Firm* — Andrew J. Anderson

(57) ABSTRACT

A printing ink for inkjet printing for improving the durability and image quality of an inkjet image including: a) a liquid carrier; b) ionic dye molecules with surface charge dissolved in the liquid carrier; and c) plate-like nanoparticles having parallel main surfaces, and minor edge surfaces, dispersed in the liquid carrier, with the main surfaces of the nanoparticles having a same sign of surface charge as the ionic dye molecule. Durability and image quality of an inkjet image is improved using the inventive ink, while also enabling a stable, printable formulation that does not require milling of the ink colorant.

17 Claims, No Drawings

INKS FOR INKJET PRINTING

FIELD OF THE INVENTION

This invention relates to an ink for inkjet printing which provides improved durability and image quality of an inkjet image when printed to an image receiver.

BACKGROUND OF THE INVENTION

Inkjet printing is a non-impact method for producing images by the deposition of ink droplets in a pixel-by-pixel manner to an image-recording element in response to digital signals. There are various methods that may be utilized to control the deposition of ink droplets on the image-recording element to yield the desired image. In one process, known as continuous inkjet (CIJ), a continuous stream of droplets is charged and deflected in an image-wise manner onto the surface of the image-recording element, while un-imaged droplets are caught and returned to an ink sump. In another process, known as drop-on-demand inkjet, individual ink droplets are projected as needed onto the image-recording element to form the desired image. Common methods of controlling the projection of ink droplets in drop-on-demand (DOD) printing include piezoelectric transducers and thermal bubble formation (thermal inkjet (TIJ)). Inkjet printers have found broad applications across markets ranging from industrial labeling to short run printing to desktop document and pictorial imaging.

The inks used in the various inkjet printers can be classified as either dye-based or pigment-based. A dye is a colorant that is dissolved in the carrier medium. A pigment is a colorant that is insoluble in the carrier medium, but is dispersed or suspended in the form of small particles, often stabilized against flocculation and settling by the use of dispersing agents. The carrier medium can be a liquid or a solid at room temperature in both cases. Commonly used carrier media include water, mixtures of water and organic solvents and high boiling organic solvents, such as hydrocarbons, esters, ketones, etc. Aqueous-based ink compositions are preferred because they are more environmentally friendly as compared to solvent-based inks, plus most printheads are designed for use with aqueous-based inks.

One disadvantage to the use of dyes is their poor image stability, especially with respect to light and ozone induced fade mechanisms. Different methods are disclosed to improve the ozone stability of inkjet images. U.S. Pat. Nos. 6,854,840 and 6,087,051, e.g., teach the use of an overcoat to form a barrier to ozone such that the ozone stability of the prints can be improved.

It is also known that ion-exchangeable clays can be used to fix water-soluble dyes. U.S. Pat. No. 5,543,453, e.g., relates to the use of clay in an overcoat for thermal transfer dye fixing by ionic exchange. U.S. Pat. Nos. 5,560,996 and 6,281,270 relate to the use of ionic clays having ionic exchange capability for ionic dyes wherein the clay is put into or coated onto the printing paper prior to printing with ionic dyes that intercalate into the clay by ion exchange. U.S. Pat. Nos. 5,644,350, 6,063,836, and 6,177,501 relate to the use of ion-exchangeable clays in paper as well. U.S. Pat. No. 6,033,466, relates to the making of a pigment from the interaction of ionic dyes and intercalatable clays, wherein the ionic dyes are intercalated into the clay by ion exchange forming a precipitate and the precipitate is milled and redispersed into a "pigment" ink. In each of such dye intercalated clay teachings, the charge on the main surfaces of the clay layers and on the dye has an opposite sign. Forming stable printing ink compositions comprising intercalated clay-dye pigment compositions has been found to be problematic, as the formed pigment compositions frequently require milling to achieve a desired colorant particle size, and farther require use of additional dispersing agents to form a stable pigment dispersion.

It is an object of this invention to provide an ink for inkjet printing comprising a dye colorant, that improves the durability of the formed inkjet printed dye image. It is another object of this invention to provide such an ink for inkjet printing wherein the image quality of the printed image is improved.

SUMMARY OF THE INVENTION

These and other objects are achieved in accordance with the present invention which comprises a printing ink for inkjet printing for improving the durability and image quality of an inkjet image comprising:
  a) a liquid carrier;
  b) ionic dye molecules with surface charge dissolved in the liquid carrier; and
  c) plate-like nanoparticles having parallel main surfaces, and minor edge surfaces, dispersed in the liquid carrier, with the main surfaces of the nanoparticles having a same sign of surface charge as the ionic dye molecule.

It was found that the durability and image quality of an inkjet image is improved using the inventive ink, while also enabling a stable, printable formulation that does not require milling of the ink colorant.

DETAILED DESCRIPTION OF THE INVENTION

Materials used in inkjet printing inks must have the correct properties to provide an ink which is stable, possesses good printing properties and provides an image with good color, sharpness and image stability. The ink composition may be colored with pigments, dyes, polymeric dyes, loaded-dye/latex particles, or any other types of colorants, or combinations thereof. The ink composition may be yellow, magenta, cyan, black, gray, red, violet, blue, green, orange, brown, etc. Many dyes are known and used in inkjet printing inks. Many have some or most of these desirable properties but it is very difficult to find a dye which possesses all of the above attributes. Inkjet inks generally contain a dye that is soluble in an ink vehicle such as water or a mixture composed of water and a known water-soluble or water-miscible organic solvent. Typically the dyes are chosen from acid, direct and reactive dyestuffs developed for the dyeing of natural fibers such as paper, wool and cotton. Water solubility of these dyes is due to the incorporation of negatively charged substituent groups such as sulfo or carboxy. Dyes are degraded by ozone and light and their stability with regard to these two agents can differ depending on media and ink composition. There is a great need to develop dye-based inks that have high optical densities on receivers and also superior lightfastness and colorfastness when printed on different types of media, in particular, fast drying or porous media as well as plain paper.

The dyes currently used in commercial aqueous ink formulations are less than optimal in one property or another. They are used because they achieve an acceptable but not superior balance of features. Some examples of such dyes are Direct yellow 132 (CAS 10114-86-0) and Direct yellow 86 (CAS 50295-42-3), acid yellow 23 (CAS 1934-21-0) and acid yellow 17 (CAS 6359-98-4) which have good hue and ozone fastness, but poor light stability. U.S. Pat. Nos. 6,468,338 and 6,464,767 disclose water-soluble azoindole dyes for use in inkjet printing including dyes derived from diazotizable heteroaromatic amines. Dyes suitable for use in inkjet inks include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Some other water soluble dyes include Acid Red 52; azo-naphthol dyes such as Acid Red 249, Direct Red 227 or Reactive Red 31; azo-aniline dyes; azo-thiazole dyes; arylazonaphthylamine dyes such as Direct Red 75 or Ilford M-377; metal-complex azo dyes such as Reactive Red 23, CAS Registry No. 347417-99-6 or any of the dyes described in U.S. Pat. No. 6,001,161 and anthrapyridone dyes such as Acid Red 80 and 82.

In accordance with the invention, the dye employed is a charged ionic dye. The charge of the dye is preferably anionic. Such dyes are anionic by virtue of ionizable substituents which have one or more negative charges at the pH of the ink. Common substituents include sulfonic acids, carboxylic acids, phosphonic acids, phosphoric acids, phenols, and their salts along with combinations thereof. Such dyes are often referred to as acid or direct dyes.

There are many different types of nanoparticles. Nanoparticles are defined when one of the dimensions of the particles is less than 100 nm. Nanoparticles can be metal, metal oxide, or organic in their chemical nature. Nanoparticles can be spherical, rod-like or plate-like in their shape. Nanoparticles can be neutral, positively or negatively charged when they are dispersed in solvents. In accordance with the present invention, charged plate-like nanoparticles having parallel main surfaces, and minor edge surfaces, are used, with the main surfaces of the nanoparticles having a same sign of surface charge as the ionic dye molecule. The charged nanoparticles are further preferred to have an opposite charge at the minor edge surfaces of the plates relative to the charge at the main surfaces. The charged nanoparticles are further preferred to have a positive charge at the edge surfaces of the plates, for use with anionic dyes. The charged nanoparticles are preferred to have an average diameter of the parallel main surfaces of less than 100 nm. It is further preferred that the average diameter is less than 50 nm. The charged nanoparticles are preferred to have an aspect ratio, which is the ratio between the main surface diameter and the minor edge surface height (i.e., thickness of the plate), higher than 2. It is further preferred that the aspect ratio of the nanoparticles is higher than 5.

The charged plate-like particle can be particles in solution of different chemical nature and possess either negative or positive net charge. It can be clay, mica, hydrotalcite or charged salts of layer structure such as zirconium phosphate and layered titanium oxide hydrate, etc. Mica-group minerals such as sodium silicic mica, sodium taeniolite and lithium taeniolite can be used as a negative charged layer particle. Layered hydrotalcite-group minerals composed of $AlO_6$ octagonal sheets can be used as positively charged layer particle. There are also known oxide hydrates and hydroxylated phosphates such as those of titanium, zirconium, lanthanum or bismuth, which particle has net positive charge in solution.

One preferred charged plate-like nanoparticles suitable for this invention is a charged clay. Clay minerals belong to the phyllosilicates. The principle building elements are two-dimensional arrays of silicon-oxygen tetrahedral and two-dimensional arrays of aluminum- or magnesium-oxygen-hydroxyl octahedral. These two building elements are arranged in different fashions to form different clays. A particular type of clay is called montmorillonites. A single sheet of montmorillonite has a thickness of about 1 nm, and comprises two tetrahedral silica outer layers and one octahedral aluminum- or magnesium-oxygen-hydroxyl inner layer. In the silica tetrahedral outer layers, tetravalent Si is sometimes partly replaced by trivalent Al. In the octahedral inner layer, there may be preplacement of trivalent Al by divalent Mg without complete filling of the third vacant octahedral position. Al atoms may also be replaced by Fe, Zn, Li, and other atoms. In many minerals, an atom of low positive valence replaces one of higher valence, resulting in a deficit of positive charge. Then the core structure has an excess of negative charge. This negative layer charge is compensated by the adsorption on the layer surfaces of cations which are too large to be accommodated in the interior of the crystal and can only reside in the outer surface of the tetrahedral silica layer. In solution, the surface of this type is solvated. The counter ion deassociate from the particle and thus a charged particle presents in the solution. Typical phyllosilicates with a net charge density of 50 to 300 milliequivalents per 100 grams are preferred. Preferred charged clay materials for the present invention include smectite clays such as montmorillonite, nontronite, beidellite, volkonskoite, hectorite, saponite, sauconite, sobockite, stevensite, svinfordite, halloysite, magadiite, kenyaite and vermiculite as well as layered double hydroxides or hydrotalcites. Most preferred layered materials include montmorillonite, hectorite and hydrotalcite, which are capable of intercalation and/or exfoliation by a variety of molecules, and also commercially available in large quantities. For further details of clay structures, see, for example, "An introduction to clay colloid chemistry," by H. van Olphen, John Wiley & Sons Publishers.

One example of montmorillonites is the synthetic laponite, which is used in the examples of this invention. Synthetic laponite, is a hydrous magnesium silicate having the ideal composition $Si_8Mg_6O_{20}(OH)_4$ modified by having a portion of the $Mg^{2+}$ and $OH^-$ ions replaced by $Li^+$ and $F^-$. The synthesis of hydrous magnesium silicates similar to natural hectorite has been described in U.S. Pat. No. 4,049,780. The particle typically has a net negative charge of 60 to 120 mmol/100 g in solution. The diameter of the plate is around 20 to 25 nm.

Liquid carriers employed in inks of the invention may comprise aqueous and/or organic solvents. Water is typically preferred, although organic liquid carriers may be preferably employed in some systems (e.g., comprising monomer compositions employed in UV-curable inks). Inks of the invention may be formed by adding the charged plate-like nanoparticles to a liquid carrier under conditions of high shear mixing, and then adding a dye solution to the resulting mixture, along with other typical ink solution addenda. The weight ratio of dye to nanoparticles in the inks may preferably be from about 10:1 to about 1:10, more preferably from about 1:1 to about 1:5.

In addition to use of water or other solvents as liquid carrier, ink compositions useful in the invention may further include humectants and/or co-solvents in order to prevent the ink composition from drying out or crusting in the nozzles of the printhead, aid solubility of the components in the ink composition, or facilitate penetration of the ink composition into the image-recording element after printing. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) polyhydric alcohols, such as ethylene glycol, diethylene glycol, triethylene glycol, tetraethylene glycol, propylene glycol, polyethylene glycol, polypropylene glycol, 1,2-propane diol, 1,3-propane diol, 1,2-butane diol, 1,3-butane diol, 1,4-butane diol, 1,2-pentane diol, 1,5-pentanediol, 1,2-hexanediol, 1,6-hexane diol, 2-methyl-2,4-pentanediol, 1,2-heptane diol, 1,7-hexane diol, 2-ethyl-1,3-hexane diol, 1,2-octane diol, 2,2,4-trimethyl-1,3-pentane diol, 1,8-octane diol, glycerol, 1,2,6-hexanetriol, 2-ethyl-2-hydroxymethyl-propane diol, saccharides and sugar alcohols and thioglycol; (3) lower mono- and di-alkyl ethers derived from the polyhydric alcohols; such as, ethylene glycol monomethyl ether, ethylene glycol monobutyl ether, ethylene glycol monoethyl ether acetate, diethylene glycol monomethyl ether, and diethylene glycol monobutyl ether acetate (4) nitrogen-containing compounds such as urea, 2-pyrrolidone, N-methyl-2-pyrrolidone, and 1,3-dimethyl-2-imidazolidinone; and (5) sulfur-containing compounds such as 2,2'-thiodiethanol, dimethyl sulfoxide and tetramethylene sulfone. Typical aqueous-based ink compositions useful in the invention may contain, for example, the following components based on the total weight of the ink: water 20-95%, humectant(s) 5-70%, and co-solvent(s) 2-20%.

While aqueous inks are preferred, the compositions of the invention may include inks based on organic solvents such as ketones including methyl-ethyl ketone, methyl-isobutyl ketone and the like; esters including ethyl acetate, ethyl lactate, propylene glycol 1-methyl ether 2-acetate and the like; glycol ethers including diethylene glycol mono-butyl ether, propylene glycol mono-methyl ether and the like; hydrocarbons including toluene, xylene, dodecane, Isopar G and the like; dimethyl sulfoxide; tetrahydrofuran; and sulfolane.

Surfactants may be added to adjust the surface tension of the ink to an appropriate level. The surfactants may be anionic, cationic, amphoteric or nonionic and used at levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols from Air Products).

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include; betaines, sultaines, and aminopropionates. Examples of cationic surfactants include; quaternary ammonium compounds, cationic amine oxides, ethoxylated fatty amines and imidazoline surfactants. Additional examples are of the above surfactants are described in "McCutcheon's Emulsifiers and Detergents: 1995, North American Editor".

A biocide may be added to an inkjet ink composition to suppress the growth of micro-organisms such as molds, fungi, etc. in aqueous inks. A preferred biocide for an ink composition is Proxel® GXL (Zeneca Specialties Co.) at a final concentration of 0.0001-0.5 wt. %. Additional additives which may optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The pH of the ink compositions of the invention may be adjusted by the addition of organic or inorganic acids or bases. Useful inks may have a preferred pH of from about 2 to 10, depending upon the type of dye or pigment being used. Typical inorganic acids include hydrochloric, phosphoric and sulfuric acids. Typical organic acids include methanesulfonic, acetic and lactic acids. Typical inorganic bases include alkali metal hydroxides and carbonates. Typical organic bases include ammonia, triethanolamine and tetramethylethylenediamine.

The ink composition may contain non-colored particles such as inorganic or polymeric particles in order to improve gloss differential, light and/or ozone resistance, waterfastness, rub resistance and various other properties of a printed image. For aqueous-based inks, polymeric particles useful in the invention include water-dispersible polymers generally classified as either addition polymers or condensation polymers, both of which are well-known to those skilled in the art of polymer chemistry. Examples of polymer classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric, film-forming, non-film-forming, fisible, or heavily cross-linked and can have a wide range of molecular weights and glass transition temperatures.

Examples of useful polymeric particles are styrene-acrylic copolymers sold under the trade names Joncryl® (S.C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco). These polymeric particles are preferred because they are compatible in typical aqueous-based ink compositions, and because they render printed images that are highly durable towards physical abrasion, light and ozone.

Ink compositions may also contain water-soluble polymers often referred to as resins or binders in the art of inkjet ink compositions. The water-soluble polymers useful in the ink composition are differentiated from polymer particles in that they are soluble in the water phase or combined water/water-soluble solvent phase of the ink. Included in this class of polymers are nonionic, anionic, amphoteric and cationic polymers. Preferably, the water-soluble polymer has the same charge as the dye and platelet particles. Representative examples of water soluble polymers include, polyvinyl alcohols, polyvinyl acetates, polyvinyl pyrrolidones, carboxy methyl cellulose, polyethyloxazolines, polyethyleneimines, polyamides and alkali soluble resins; polyurethanes (such as those found in U.S. Pat. No. 6,268,101), polyacrylic acids, styrene-acrylic methacrylic acid copolymers (such as; as Joncryl® 70 from S.C. Johnson Co., TruDot™ IJ-4655 from MeadWestvaco Corp., and Vancryl® 68S from Air Products and Chemicals, Inc) and styrene maleic anhydride copolymers (such as; SMA® 1440, 17352, 1000, and 2000 from Sartomer).

The exact choice of ink components will depend upon the specific application and performance requirements of the printhead from which they are jetted. Thermal and piezoelectric drop-on-demand printheads and continuous printheads each require ink compositions with a different set of physical properties in order to achieve reliable and accurate jetting of the ink, as is well known in the art of inkjet printing. Acceptable viscosities are typically no greater than 20 cP, and preferably in the range of about 1.0 to 6.0 cP. Acceptable surface tensions are typically no greater than 60 dynes/cm, and preferably in the range of 28 dynes/cm to 45 dynes/cm.

The inkjet inks provided by this invention may be employed in inkjet printing wherein liquid ink drops are applied in a controlled fashion to an ink receiver, by ejecting ink droplets from a plurality of nozzles or orifices of the print head of an inkjet printer. The inks are suitable for use with any of the common inkjet heads for ejecting ink droplets in either drop-on-demand or continuous modalities. An inkjet printing method in accordance with the present invention may comprise the steps of: a) providing an inkjet printer that is responsive to digital data signals; b) loading said printer with an inkjet recording element; c) loading said printer with an aqueous inkjet ink composition of the invention; and d) applying said inkjet ink composition to said inkjet recording element in response to said digital data signals.

The inks of the invention may be used with any inkjet receiver substrate. Ink-receptive substrates useful in inkjet printing are well known to those skilled in the art. Representative examples of such substrates are disclosed in U.S. Pat. Nos. 5,605,750; 5,723,211; and 5,789,070 and EP 813 978 A1. The inks may be used with plain paper as well as other receivers.

An inkjet recording element typically comprises a support having on at least one surface thereof an ink-receiving or image-receiving layer, and includes those intended for reflection viewing, which have an opaque support, and those intended for viewing by transmitted light, which have a transparent support.

In addition to plain paper, there are generally two types of ink-receiving layers (IRL's). The first type of IRL comprises a non-porous coating of a polymer with a high capacity for swelling and absorbing ink by molecular diffusion. Cationic or anionic substances are added to the coating to serve as a dye fixing agent or mordant for the cationic or anionic dye. This coating is optically transparent and very smooth, leading to a high glossy "photo-grade" receiver. The second type of IRL comprises a porous coating of inorganic, polymeric, or organic-inorganic composite particles, a polymeric binder, and additives such as dye-fixing agents or mordants. These particles can vary in chemical composition, size, shape, and intra-particle porosity. In this case, the printing liquid is absorbed into the open pores of the IRL to obtain a print which is instantaneously dry to the touch.

Inks containing ionic dyes and plate-like nanoparticles of this invention may be used in ink sets in combination with inks containing other dyes and pigments useful for inkjet printing. Dyes useful for inkjet printing are normally water soluble dyes of the Acid, Direct, Reactive or Basic Color Index classifications. Typically ink sets may comprise magenta and cyan inks along with the yellow ink, but may also include one or more black inks, lower strength (light) yellow, magenta and cyan inks and alternate color inks such as orange, red, blue, green, etc. Typical cyan dyes may be copper phthalocyanine derivatives such as Direct Blue 199 and 86; triarylmethane dyes such as Acid Blue 9; azo, metal-complex azo, metal-complex formazan or anthraquinone dyes. Typical magenta dyes may be xanthene dyes such as Acid Red 52; azo-naphthol dyes such as Acid Red 249, Direct Red 227 or Reactive Red 31; azo-aniline dyes; azo-thiazole dyes; arylazonaphthylamine dyes such as Direct Red 75 or Ilford M-377; metal-complex azo dyes such as Reactive Red 23, CAS Registry No. 347417-99-6 or any of the dyes described in U.S. Pat. No. 6,001,161; anthrapyridone dyes such as Acid Red 80 and 82; or anthraquinone dyes. Typical black dyes that are useful for inkjet printing include polyazo dyes such as Food Black 2, Direct Black 22 or Direct Black 19: metal-complex polyazo dyes such as Reactive Black 31, Pacified Reactive Black 31 or Ilford K-1334; sulfur black dyes or aniline black dyes.

EXAMPLES

The following examples are provided to illustrate the invention.
Materials:
Clays:
A type of synthetic clay was used in this invention. It was manufactured by Southern Clay Products and has a tradename of Laponite. According to the product brochure, the Laponites are synthetic layered hydrous magnesium silicates. The clay single sheet of all the laponite clays has an average diameter of 20 to 25 nm of the main plane and a thickness of about 1 nm of its minor plane. It has a net negative charge of 60 to 120 mmol/100 grams in solution. Three laponite clays, Laponite RD, RDS and JS were used in this invention. Laponite RD and RDS have the same particle chemical composition, only that Laponite RDS has incorporated an inorganic polyphosphate. Laponite JS is a layered fluorosilicate with inorganic polyphosphate.
Dyes:

Cyan dye: Direct Blue 199

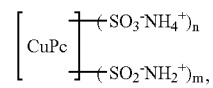

$n = 1-4, m = 0-3, m + n = 3-4$

Magenta dye: Kodak Lightfast Magenta 1

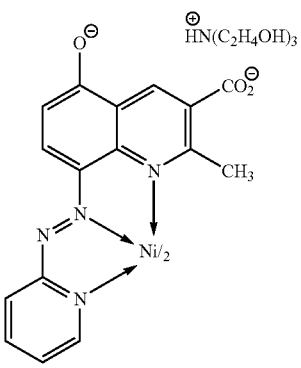

Black dye: Passivated Reactive Black 31

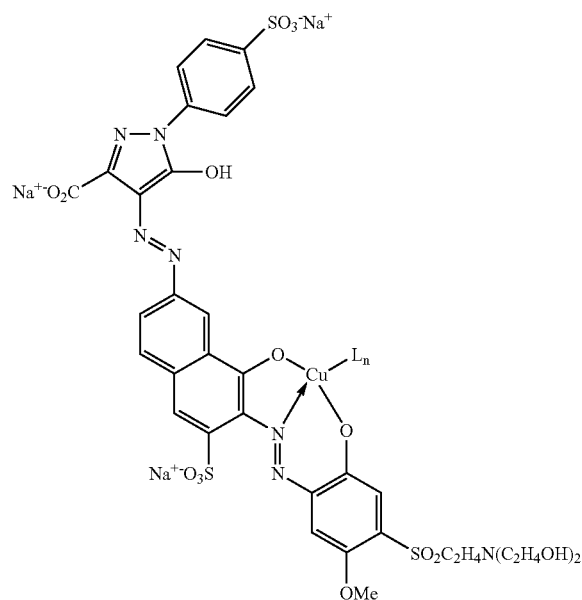

Media:
 Porous media: Kodak Ultra Premium Photo Paper
 Plain paper: Hammermill ForeMP paper by International Paper.
Printer:
 Epson Stylus C88
Coater:
 Comb rods were obtained from R. D. Specialities, Inc., Webster, N.Y.
Evaluation:
 Optical density of the test prints were measured using calibrated X-rite™ densitometer. Test prints were placed in a darkened ozone chamber with a concentration of 5 ppm ozone for different period of time. The optical density of the patches was recorded before and after exposure and the amount of original density retained was calculated as the ratio of densities for the 100% ink patch.

Preparation of Inks

Comparative Ink Example 1

Mix the following ingredients, 2.5% Direct blue 199, 2.5% glycerol, 7.5% ethylene glycol, 2% 2-pyrrolidinone, 0.5% Surfynol 465 and balance water together to form Ink CI-1.

Ink Example 1

Slowly add Laponite RDS to deionized water at 60° C., mix with high shear for 30 mins. Continue stir at room temperature overnight to form a 2% Laponite RDS solution. Add 10% Direct blue 199 to the clay solution at a ratio of dye to clay of 1:1 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with blue dye concentration of 2.5% and labeled as Ink E-1.

Ink Example 2

Slowly add Laponite RDS to deionized water at 60° C., mix with high shear for 30 mins. Continue stir at room temperature overnight to form a 4% Laponite RDS solution. Add 10% Direct blue 199 to the clay solution at a ratio of dye to clay of 1:1 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with blue dye concentration of 2.5% and labeled as Ink E-2.

Ink Example 3

Slowly add Laponite RDS to deionized water at 60° C., mix with high shear for 30 mins. Continue stir at room temperature overnight to form a 10% Laponite RDS solution. Add 10% Direct blue 199 to the clay solution at a ratio of dye to clay of 1:1 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with blue dye concentration of 2.5% and labeled as Ink E-3.

Comparative Ink Example 2

Mix the following ingredients, 1% magenta dye (Kodak Lightfast Magenta 1, above), 2.5% glycerol, 7.5% ethylene glycol, 2% 2-pyrrolidinone, 0.5% Surfynol 465 and balance water together to form Ink CI-2.

Ink Example 4

Slowly add Laponite RDS to deionized water at 60° C., mix with high shear for 30 mins. Continue stir at room temperature overnight to form a 2% Laponite RDS solution. Add 5% magenta dye to the clay solution at a ratio of dye to clay of 1:1 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with magenta dye concentration of 1% and labeled as Ink E-4.

Ink Example 5

Slowly add Laponite RDS to deionized water at 60° C., mix with high shear for 30 mins. Continue stir at room temperature overnight to form a 2% Laponite REDS solution. Add 5% magenta dye to the clay solution at a ratio of dye to clay of 1:2 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with magenta dye concentration of 1% and labeled as Ink E-5.

Ink Example 6

Slowly add Laponite RDS to deionized water at 60° C., mix with high shear for 30 mins. Continue stir at room temperature overnight to form a 2% Laponite RDS solution. Add 5% magenta dye to the clay solution at a ratio of dye to clay of 1:5 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with magenta dye concentration of 1% and labeled as Ink E-6.

Comparative Ink Example 3

Mix the following ingredients, 5% black dye (pacified Reactive Black 31, above), 2.5% glycerol, 7.5% ethylene glycol, 2% 2-pyrrolidinone, 0.5% Surfynol 465 and balance water together to form Ink CI-3.

Ink Example 7

Slowly add Laponite RDS to deionized water at 60° C., mix with high shear for 30 mins. Continue stir at room temperature overnight to form a 2% Laponite RDS solution. Add 10% black dye to the clay solution at a ratio of dye to clay of 1:1 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with black dye concentration of 5% and labeled as Ink E-7.

Ink Example 8

Slowly add Laponite RD to deionized water at 60° C., mix with high shear for 30 mins. Continue stir at room temperature overnight to form a 2% Laponite RD solution. Add 10% Direct blue 199 to the clay solution at a ratio of dye to clay of 1:1 and heat the mixture to 60° C. for 30 mins. Add the rest of the addenda: 2.5% glycerol, 7.5% ethylene glycol, 2% 2-pyrrolidinone, 0.5% Surfynol 465 and balance water to make an ink with blue dye concentration of 2.5% and labeled as Ink E-8.

Ink Example 9

Slowly add Laponite JS to deionized water at 60° C., mix with high shear for 30 mins. Continue stir at room temperature overnight to form a 2% Laponite JS solution. Add 10% Direct blue 199 to the clay solution at a ratio of dye to clay of 1:1 and heat the mixture to 60° C. for 30 mins. Add the rest of the addenda: 2.5% glycerol, 7.5% ethylene glycol, 2% 2-pyrrolidinone, 0.5% Surfynol 465 and balance water to make it an ink with blue dye concentration of 2.5% and labeled as Ink E-9.

Generation of Example Images

A #4 comb rod was used to coat a strip of color using the Ink CI-1 on the porous media to form Comparative Example 1.

A #4 comb rod was used to coat a strip of color using the Ink E-1 on the porous media to form Example 1.

A #4 comb rod was used to coat a strip of color using the Ink E-2 on the porous media to form Example 2.

A #4 comb rod was used to coat a strip of color using the Ink E-3 on the porous media to form Example 3.

A #4 comb rod was used to coat a strip of color using the Ink CI-2 on the porous media to form Comparative Example 2.

A #4 comb rod was used to coat a strip of color using the Ink E-4 on the porous media to form Example 4.

A #4 comb rod was used to coat a strip of color using the Ink E-S on the porous media to form Example 5.

A #4 comb rod was used to coat a strip of color using the Ink E-6 on the porous media to form Example 6.

A #4 comb rod was used to coat a strip of color using the Ink CI-3 on the porous media to form Comparative Example 3.

A #4 comb rod was used to coat a strip of color using the Ink E-7 on the porous media to form Example 7.

A #4 comb rod was used to coat a strip of color using the Ink E-8 on the porous media to form Example 8.

A #4 comb rod was used to coat a strip of color using the Ink E-9 on the porous media to form Example 9.

Ink CI-3 was loaded into a cartridge and deposited on a porous media using Espon printer to generate a Dmax (maximum density) patch as Comparative Example 4.

Ink 1-7 was loaded into a cartridge and deposited on a porous media using Espon printer to generate a Dmax (maximum density) patch as Example 10.

Ink CI-1 was loaded into a cartridge and deposited on a porous media using Espon printer to generate a Dmax (maximum density) patch as Comparative Example 5.

Ink 1-3 was loaded into a cartridge and deposited on a porous media using Espon printer to generate a Dmax (maximum density) patch as Example 11.

A #4 comb rod was used to coat a strip of color using the Ink CI-3 on the plain paper to form Comparative Example 6.

A #4 comb rod was used to coat a strip of color using the Ink 1-7 on the plain paper to form Example 12.

The evaluation of all the printed targets were done accordingly and the results are shown in Table 1. Table 1 clearly shows that the incorporation of the negatively surface-charged nanoparticulate clay into an anionic dye-based ink significantly increases the maximum optical density and also the resistance to ozone of the printed images. The examples also show that the inventive ink is jettable using an inkjet printing head, without requiring the milling of pigment particles. The examples further show that the ozone stability of the image is better with the ink comprising of Laponite RD (Example 8), than that of Laponite RDS (Example 1), and further Laponite JS (Example 9). The examples also show the ink preparation may affect the performance. When the same clay is used in Examples 1-3, e.g., the ink prepared with higher concentration clay solution is better than that of lower concentration clay solution although the final clay loading is the same in all three inks. The examples also show that the ink comprising clay generates higher optical density when printed on plain paper (Comparative Example 6 and Example 12).

TABLE 1

The optical density and ozone stability of the inventive examples and comparative examples.

| | original optical density | 2 hours | 1 day | 3 days | 7 days | 15 days | 30 days | 37 days |
|---|---|---|---|---|---|---|---|---|
| Red channel | | | | | | | | |
| Comparative Example 1 | 2.0 | | 61 | 49 | 35 | 41 | 27 | 20 |
| Example 1 | 2.0 | | 94 | 95 | 93 | 94 | 82 | 65 |
| Example 2 | 2.0 | | 99 | 96 | 96 | 90 | 84 | 84 |
| Example 3 | 2.0 | | 100 | 99 | 94 | 98 | 94 | 87 |
| Green channel | | | | | | | | |
| Comparative Example 2 | 1.8 | 18.0 | | | | | | |
| Example 4 | 2.1 | 83.0 | | | | | | |
| Example 5 | 2.6 | 89.6 | | | | | | |
| Example 6 | 2.9 | 90.6 | | | | | | |
| Black channel | | | | | | | | |
| Comparative Example 3 | 1.8 | 70.0 | | 37 | 22 | | | |
| Example 7 | 2.0 | 99.0 | | 94 | 96 | | | |
| Red channel | | | | | | | | |
| Example 8 | | | | 98 | | | | |
| Example 9 | | | | 80 | | | | |
| Green channel | | | | | | | | |
| Comparative Example 4 | 1.5 | | | 65 | 57 | | | 37 |
| Example 10 | 1.9 | | | 87 | 80 | | | 53 |
| Comparative Example 5 | 2.0 | | 100 | 89 | 66 | 53 | 45 | 24 |
| Example 11 | 2.5 | | 100 | 94 | 83 | 76 | 74 | 58 |
| Comparative Example 6 | 1.0 | | 98 | 98 | | | | |
| Example 12 | 1.5 | | 100 | 100 | | | | |

Although the invention has been described in detail with reference to certain preferred embodiments for the purpose of illustration, it is to be understood that variations and modifications can be made by those skilled in the art without departing from the spirit and scope of the invention.

What is claimed is:

1. A printing ink comprising:
   a) a liquid carrier;
   b) ionic dye molecules with surface charge dissolved in the liquid carrier; and
   c) plate-like nanoparticles having parallel main surfaces, and minor edge surfaces, dispersed in the liquid carrier, with the main surfaces of the nanoparticles having a same sign of surface charge as the ionic dye molecules.

2. The printing ink of claim 1, wherein the minor edge surfaces of the plate-like nanoparticles have an opposite sign of surface charge as that of the dye molecules.

3. The printing ink of claim 1, wherein the nanoparticles have an average aspect ratio, which is the ratio between the diameter of the main surfaces and the height of the minor edge surfaces, higher than 2.

4. The printing ink of claim 3, wherein the average aspect ratio of the nanoparticles is higher than 5.

5. The printing ink of claim 1, wherein the dye is a negatively charged dye.

6. The printing ink of claim 4, wherein the nanoparticles comprise a cation-exchangeable layered clay having major surfaces with negative charge.

7. The printing ink of claim 5, wherein the nanoparticles comprise a montmorillonoids clay.

8. The printing ink of claim 1, wherein the nanoparticles comprise a hectorite clay.

9. The printing ink of claim 1, wherein the nanoparticles comprise a synthetic clay.

10. The printing ink of claim 1, wherein the nanoparticles have an average diameter of the main surfaces of less than 100 nm.

11. The printing ink of claim 1, wherein the liquid carrier comprises water.

12. The printing ink of claim 11, further comprising a humectant.

13. The printing ink of claim 1, wherein the weight ratio of dye to nanoparticles is from about 10:1 to about 1:10.

14. The printing ink of claim 1, wherein the weight ratio of dye to nanoparticles is from about 1:1 to about 1:5.

15. An inkjet printing method comprising the steps of:
 a) providing an inkjet printer that is responsive to digital data signals;
 b) loading said printer with an inkjet recording element;
 c) loading said printer with an inkjet ink composition of claim 1; and
 d) applying said inkjet ink composition to said inkjet recording element in response to said digital data signals.

16. The method of claim 15, wherein the inkjet recording element comprises a support coated with a porous ink receiving layer.

17. The method of claim 15, wherein the inkjet recording element comprises plain paper.

\* \* \* \* \*